United States Patent [19]

Kessler

[11] 4,181,487
[45] Jan. 1, 1980

[54] VACUUM SIZING APPARATUS

[76] Inventor: Milton Kessler, 6690 Harrington Ave., Youngstown, Ohio 44512

[21] Appl. No.: 863,886

[22] Filed: Dec. 23, 1977

[51] Int. Cl.² ............................................. B29D 23/00
[52] U.S. Cl. ................................ 425/326.1; 425/388; 264/209; 264/566
[58] Field of Search ..................... 425/326.1, 388, 392; 264/89, 90, 93, 209, 94

[56] References Cited

U.S. PATENT DOCUMENTS

| | | | |
|---|---|---|---|
| 3,274,315 | 9/1966 | Kawamura | 425/326.1 X |
| 3,333,036 | 7/1967 | Maurer et al. | 264/94 |
| 3,415,089 | 12/1968 | Ferchland | 425/326.1 X |
| 3,792,951 | 2/1974 | Meyers | 425/326.1 |
| 3,804,574 | 4/1974 | Gatto | 425/388 |
| 3,996,323 | 12/1976 | Hegler et al. | 425/326.1 X |

FOREIGN PATENT DOCUMENTS 45-36020  11/1970  Japan ..................................... 425/326.1

*Primary Examiner*—Robert L. Spicer, Jr.
*Attorney, Agent, or Firm*—Burge & Porter Co.

[57] ABSTRACT

A vacuum sizing apparatus is positioned downstream from an extruder along a path followed by a body of thermoplastics material as the body exudes in a heated, deformable state from the extruder. The apparatus includes structure defining an elongate sizing surface extending along the path of travel of the body. A multiplicity of vacuum channels are formed in the structure and open through the sizing surface for drawing outer wall portions of the body into conforming engagement with the sizing surface as the wall portions cool and rigidify while moving along the sizing surface. The structure includes a plurality of side-by-side structural segments, each of which defines a portion of the sizing surface, adjacent ones of which have mating side walls. The vacuum channels are of small cross section and are formed as grooves milled or ground in the side walls of the segments. A clamping system releasably clamps the segments together and permits their disassembly to provide access to the vacuum channels for cleaning.

22 Claims, 7 Drawing Figures

VACUUM SIZING APPARATUS

BACKGROUND OF THE INVENTION

1. Field of the Invention

The present invention relates to the vacuum sizing of extruded bodies and, more particularly, to a vacuum sizing apparatus having a sizing surface defined by a clamped-together assembly of structural segments with vacuum channels formed as grooves in side walls of the segments.

2. Prior Art

In the formation of continuous lengths of thermoplastics material, it is customary to utilize an extruder having a die through which heated material is extruded. The die constricts the flow of plastics material, causing it to conform to a desired cross-sectional shape and size as it exudes and issues from the die.

Since some thermoplastics material tends to expand upon leaving the die, and since the plastics material emerging from the die is in a heated, deformable state, it is generally the practice to feed the extruded material to a sizing fixture which causes the material to maintain or assume the desired cross-sectional configuration and size as the material cools and rigidifies.

One type of sizing fixture which has been used with good success provides an elongate sizing surface positioned downstream from the extruder along the path followed by the body of plastics material as it emerges from the die. A large number of vacuum channels, in the form of small diameter holes, open through the sizing surface. A system of conduits is provided which communicates the holes with a vacuum source. Sizing fixtures of this type are known in the art as "vacuum sizing apparatus" due to their use of the principle of vacuum evacuation across the sizing surface to maintain outer wall portions of the plastics body in conforming engagement with the sizing surface as the body moves along the sizing surface.

One type of vacuum sizing apparatus employs a plurality of sizing units arranged in sequence along the path of travel followed by the extruded thermoplastics material. Where this approach is utilized, each of the sizing units has a sizing surface which operates on only a portion of the outer wall surface of the plastics body. A system of this type is described in U.S. Pat. No. 4,020,136.

Another type of vacuum sizing apparatus has a sizing surface which defines an elongate passage having the desired cross section unto which outer walls surfaces of the extruded plastics body are to be conformed. As the body travels through the passage, its outer walls are drawn into conforming engagement with the sizing surface. In some instances, a vacuum sizing apparatus of this type is positioned in a fluid-containing vacuum evacuated cooling chamber, as described in U.S. Pat. No. 3,804,574. In other instances, the vacuum sizing apparatus is provided with an encompassing cooling system, as described in U.S. Pat. No. 3,668,288. In still other applications, the vacuum sizing apparatus is located upstream and/or downstream from one or more cooling units, as described in U.S. Pat. Nos. 3,296,661 and 3,229,005.

In order for vacuum sizing apparatus to function properly in certain applications, it is important that the vacuum channels which open through the sizing surface be of very small cross-sectional area. Holes having a diameter of about 0.001 inch, and a corresponding cross-sectional area of about 0.0000008 square inches, are found to be quite suitable for use in many vacuum sizing operations. A large number of these holes are needed and they are ordinarily uniformly spaced across the vacuum sizing surface.

In fabricating vacuum sizing apparatus, it has long been the accepted practice to form the needed vacuum channels by individually drilling a multitude of small diameter holes. Drilling a large number of minute holes at accurately spaced intervals across a large sizing surface is time consuming and expensive. In fact, the most costly aspect of manufacturing most vacuum sizing units relates to the steps involved in accurately positioning and drilling the many tiny holes needed to form vacuum evacuation channels.

In many instances, it is desirable to form the structure which defines a vacuum sizing surface from a relatively hard, corrosion resistant material such as stainless steel. As is well known to those skilled in the art, hard materials such as stainless steel are difficult to drill, particularly where the size of the holes to be drilled is quite small. Accordingly, it has become customary to accept sizing apparatus fabricated from less desirable materials which are more adaptable to drilling, or to pay very high costs for the fabrication of vacuum sizing structures from higher quality materials that are difficult to drill.

Still another problem with previously proposed vacuum sizing apparatus is that the small diameter vacuum holes tend to become clogged during use and are difficult to clean. In some instances, the holes become so clogged as to practically defy cleaning. In most instances, it is difficult to effect a thorough cleaning of the holes.

SUMMARY OF THE INVENTION

The present invention overcomes the foregoing and other drawbacks of prior proposals by providing a vacuum sizing apparatus wherein a vacuum sizing surface is defined by a plurality of clamped-together side-by-side segments, and vacuum channels are formed as grooves in side walls of the segments.

Vacuum sizing units embodying the preferred practice of the present invention utilize a plurality of structural segments arranged side-by-side with each segment defining a separate portion of a sizing surface. Adjacent ones of the segments have side walls extending in mating engagement in planes which intersect the sizing surface. Grooves are provided in the side walls between adjacent ones of the structural segments to define vacuum channels opening through the sizing surface. A clamping system is provided to releasably clamp the structural segments together.

An important feature of the invention lies in the ease with which the required vacuum channels can be formed. In preferred practice, the vacuum channels are formed by milling or grinding grooves in the segment side walls using conventional milling or grinding equipment. Supply passages for communicating the vacuum channels with a vacuum source can also be formed as machined grooves in the segment side walls. Holes can be formed through the segments to cooperate with the supply passages in providing a system of interconnecting conduits for communicating the vacuum channels with a vacuum source. The machining operations required to form the vacuum channels are much less expensive to carry out than are the drilling operations required to form a multitide of small diameter holes in a large vacuum sizing surface, particularly where the material from which the surface is formed is a hard, corrosion resistant material such as stainless steel.

Another feature relates to the ease with which vacuum channels of dimensionally different cross sections can be provided as may be desired to concentrate the vacuum evacuation forces in particularly troublesome areas of the sizing surface where added force is needed to effect conformance of the plastics material to the shape of the sizing surface. This feature is particularly important in dealing with extrusions of complex cross section.

A further significant feature of the invention is the ease with which the vacuum channels can be cleaned. The assembled segments are clamped together by a releasable clamping means which, when released, permits access to the side walls of the segments, exposing the entire lengths of the vacuum channel grooves. As will be appreciated, the clamping system can be released and the segments separated, cleaned and reassembled in a minimal amount of time. The resulting down time for cleaning of vacuum channels is substantially less than is incurred where a multitude of small diameter holes must be individually cleaned as in previously proposed systems. Moreover, a more thorough cleaning of the vacuum channels tends to result due to the access provided to the entire lengths of the vacuum channels, thereby enabling a newly cleaned sizing structure to be utilized for a longer period of time than is possible where an incomplete cleaning of the vacuum channels is effected.

It is an object of the present invention to provide a novel and improved vacuum sizing apparatus wherein a sizing surface is defined by portions of a plurality of clamped-together side-by side segments having vacuum channel grooves formed in side walls of the segments.

It is another object of the present invention to provide a novel and improved vacuum sizing apparatus wherein a multiplicity of vacuum channels opening through a sizing surface may be formed at substantially less expense than is occasioned in the fabrication of previously proposed vacuum sizing apparatus.

It is a further object of the invention to provide a novel and improved vacuum sizing apparatus wherein a multiplicity of small vacuum channels opening through a vacuum sizing surface can be readily formed in materials which are difficult to drill.

It is a further object to provide a novel and improved vacuum sizing apparatus wherein a multiplicity of vacuum channels of non-circular and/or varying cross-sectional dimensions may be provided as needed to concentrate the application of vacuum sizing forces in desired regions of the sizing surface to enhance vacuum sizing performance particularly when working with plastics material extrusions of complex cross section.

It is another object to provide a novel and improved vacuum sizing apparatus having vacuum channels which are easy to clean.

It is a further object of the invention to provide novel and improved methods of forming vacuum sizing apparatus.

These and other objects, and a fuller understanding of the invention, may be had by referring to the following description and claims taken in conjunction with the accompanying drawings.

DESCRIPTION OF THE PREFERRED EMBODIMENT

Figure 1:
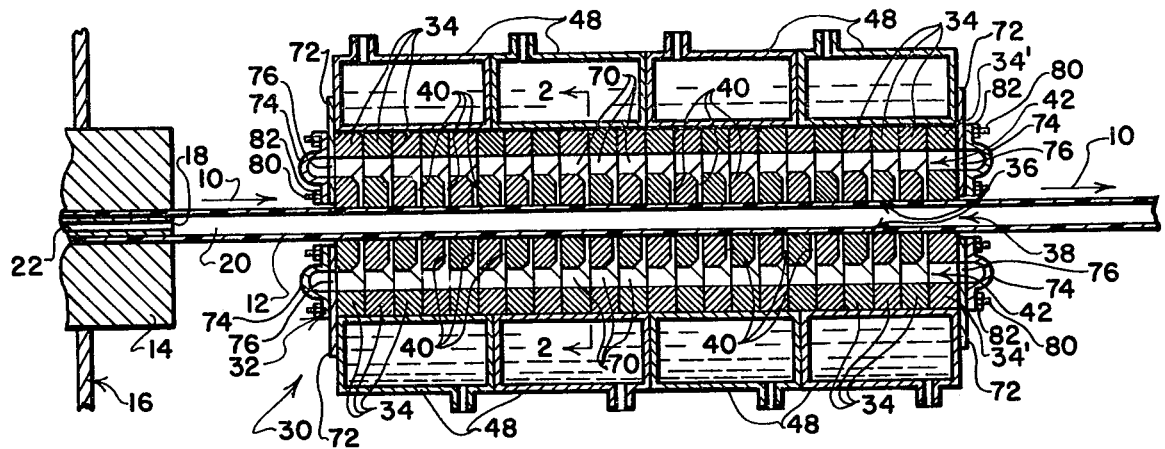
FIG. 1 is a longitudinal sectional view showing a body of thermoplastics material as it exudes from an extruder and passes through a vacuum sizing apparatus embodying the preferred practice of the present invention, the sizing apparatus being positioned downstream from the extruder and being operative to conform outer wall portions of the body to a desired, predetermined cross-sectional configuration.

Referring to FIG. 1, arrows 10 indicate the path of travel of a body 12 of thermoplastics material as the body 12 exudes in a heated, deformable state from a die 14 of a conventional extruder, indicated generally by the numeral 16. The die 14 may be provided with a mandrel 18 therein to form one or more hollow passages 20 through the body 12, as is well known in the art. The mandrel 18 may be provided with one or more air passages 22 through which pressurized air is discharged into the hollow body passages 20 to prevent outer walls of the body 12 from collapsing while they are still in a heated, deformable state.

A vacuum sizing apparatus embodying the preferred practice of the present invention is indicated generally by the numeral 30. The sizing apparatus 30 is positioned downstream from the extruder 16 along the path of travel of the body 12. As will be explained in greater detail, the sizing apparatus 30 includes an assembly 32 of clamped-together structural segments 34, 34'. Each of the structural segments 34, 34' has an inner wall which defines a portion of a sizing surface, indicated generally by the numeral 36. In the embodiment shown in the drawings, the sizing surface 36 forms an elongate passage 38 through which the body 12 travels. The passage 38 has the desired cross-sectional configuration and size unto which outer wall portions of the body 12 are to be conformed.

As will also be explained in greater detail, a multiplicity of vacuum channel grooves 40 are formed in side walls of the segments 34 and open through the sizing surface 36. The segments 34 are identical one with another and extend in side-by-side relationship from the left end of the assembly 32, as viewed in FIG. 1, to nearly the right end of the assembly 32. The segments 34' are located at the extreme right end of the assembly 32, as viewed in FIG. 1, and differ from the segments 34 in that they have entirely flat side walls with no vacuum channel grooves formed therein. A system of interconnected conduit formations, indicated generally by the numeral 42, is provided for communicating the vacuum channels 40 with a conventional vacuum source, not shown. As the body 12 travels through the passage 38, outer wall portions of the body 12 are drawn into engagement with the sizing surface 36 and are caused to conform to the cross-sectional configuration and size of the passage 38 as these outer wall portions cool and rigidify during movement along the sizing surface 36.

While the structural segment assembly 32 is shown as being encompassed by water cooling coils 48 much like those described in U.S. Pat. No. 3,668,288, it will be understood that the cooling coils 48 form no part of the present invention. The segmented sizing fixture features of the present invention apply equally well to other types of vacuum sizing apparatus installations where no cooling systems are used, or where cooling systems of other types are used. Likewise, while the segmented sizing fixture depicted in the drawings defines a passage through which a body of plastics material must travel, features of the invention can be incorporated equally well in vacuum sizing units whose sizing surfaces do not form passages, as, for example, where a series of sizing units are arranged sequentially downstream from an extruder to treat different surface portions of an extruded body.

Figure 2:
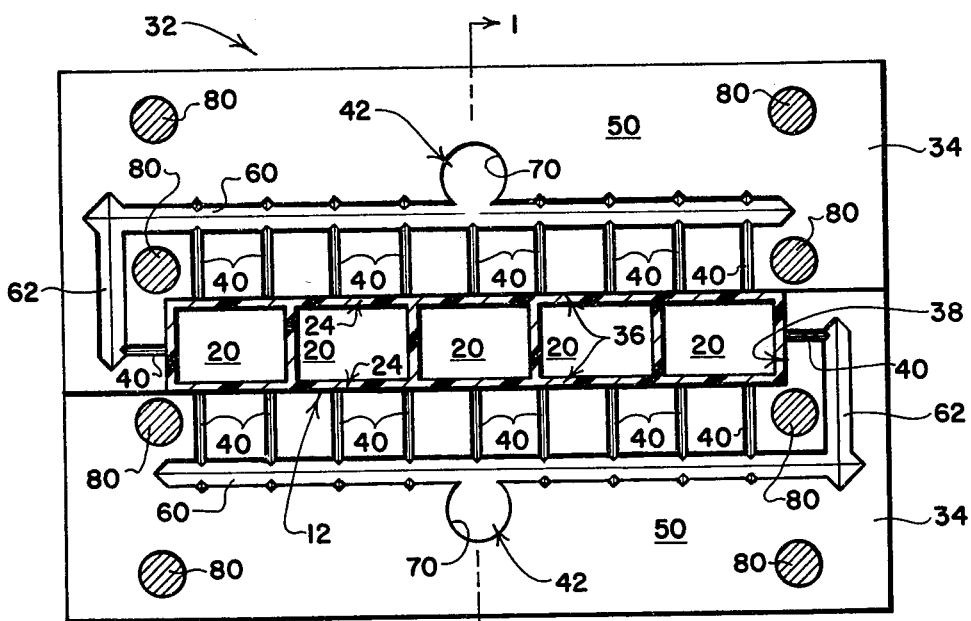
FIG. 2 is an enlarged, transverse sectional view of the body and of a portion of the sizing apparatus, as seen from a plane indicated by a line 2—2 in FIG. 1.

Referring to FIG. 2 in conjunction with FIG. 1, the segments 34 are of L-shaped configuration and are arranged in upper and lower sets to provide a sizing surface 36 which defines a passage 38 of substantially rectangular cross-section. In preferred practice, the upper and lower segments 34 are identical to maximize interchangeability and to assure that these segments are not incorrectly reassembled following their separation for cleaning. Nonetheless, this desired interchangebility is frequently unattainable in view of the nonsymmetrical nature of the cross sections to be imparted to bodies of material extruded from the die 14.

While the body 12 is depicted in FIG. 2 as having a generally rectangular cross-section with a plurality of side-by side hollow passages 20 formed therethrough, it will be appreciated that the body 12 can have practically any desired cross-sectional configuration and size, and that the segments 34 can be designed to provide a sizing surface 36 which forms a passage 38 of the required cross-sectional configuration and size. While the structural segments 34 are shown arranged in upper and lower sets with sidewalls extending substantially transverse to the length of the passage 38, it will be appreciated that each pair of upper and lower segments 34 can be formed as a single segment; or that various combinations and arrangements of segments, e.g. left and right segments, can be provided instead of the upper and lower arrangement of segments illustrated in FIG. 2; or that segments having mating side walls extending in directions other than transverse to the length of the passage 38 can be utilized. In short, the principles of the present invention have wide application and can be utilized to form segmented vacuum sizing units which differ quite significantly in the arrangement and character of their segments from the preferred embodiment illustrated in the drawings.

Figure 3:
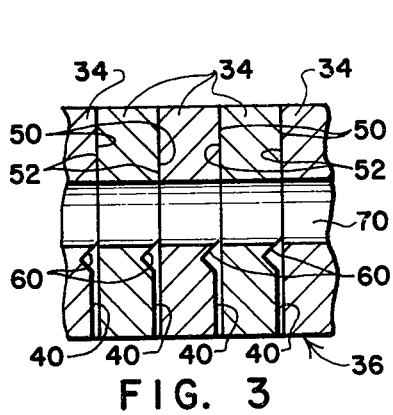
FIG. 3 is an enlargement of a portion of the longitudinal sectional view of FIG. 1.

Referring to FIG. 3, each of the segments 34 has a pair of flat side walls 50, 52 on opposite sides thereof. Adjacent ones of the segments 34 are arranged such that the side wall 50 of one of the adjacent segments 34 extends in mating engagement with the side wall 52 of the other of the adjacent segments 34. The side walls 50, 52 extend in planes which intersect the sizing surface 36 and which extend transversely of the length of the passage 38.

The vacuum channel grooves 40 are formed in the side walls 50. Each of the grooves 40 faces toward and is closed by an associated side wall 52. By this arrangement, the grooves 40 cooperate with the side walls 52 to define vacuum channels of quite small cross-section which communicate with the passage 38. While the cross-sectional areas of these vacuum channels are preferably identical, they can be formed to have different areas as may be desired at selected locations across the sizing surface 36.

Each of the side walls 50 has a supply groove 60 and a supply groove 62 formed therein. The grooves 60, 62 intersect and communicate with each other and with such vacuum channel grooves 40 as are formed in their associated side wall 50. The supply grooves 60, 62 face toward and are closed by an associated side wall 52, whereby the grooves 60, 62 and their associated side walls 52 define supply passages. The supply grooves 60, 62 are deeper and wider than the vacuum channel grooves 40 so that they provide supply passages of substantially larger cross-section than the vacuum channels.

Aligned holes 70 are formed through the segments 34, 34'. The holes 70 intersect and communicate with the supply grooves 60. The holes 70 and the supply grooves 60, 62 comprise part of the conduit system 42.

Referring to FIG. 1, end plates 72 are provided at opposite ends of the segment assembly 32. Vacuum headers 74 are mounted on the end plates 72. Holes 76 are formed through the end plates 72 to communicate the vacuum headers 74 with the aligned holes 70, 76. The vacuum headers 74 are of a conventional type and communicate the aligned holes 70, 76 with a conventional vacuum source, not shown.

Threaded rods 80 extend through aligned holes formed in the headers, the end plates and the segments 74, 72, 34, 34'. Suitable fasteners 82 are threaded onto the ends of the rods 80 to clamp the headers, the end plates and the segments 74, 72, 34, 34' together. The threaded rods 80 and the fasteners 82 provide a releasable clamping assembly which facilitates rapid disassembly of the segments 34, 34' to permit cleaning of the grooves 40, 60, 62.

Figure 4:
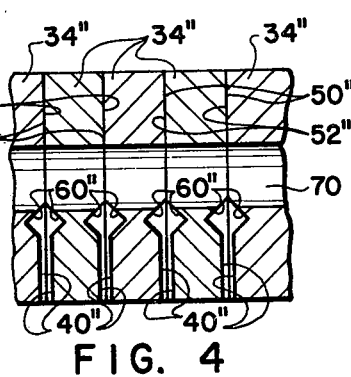
FIGS. 4 and 5 are longitudinal sectional views similar to FIG. 3, illustrating alternate embodiments of the invention; and, FIGS. 6 and 7 are enlarged perspective views of vacuum sizing apparatus portions illustrating a variety of configurations and arrangements of vacuum sizing grooves which may be employed in accordance with the practice of the present invention.

While it is preferred that the vacuum and supply grooves 60, 62 be formed only in the segment side walls 50, selected ones of these grooves can be formed in the side walls 52. Such an arrangement is illustrated in FIG. 4 where segments 34" have grooves 40", 60" formed in each of their side walls 50", 52". In the embodiment of FIG. 4, such grooves 40" and 60" as are formed in mating ones of the side walls 50", 52" extend in overlying, communicating relationship.

Figure 5:
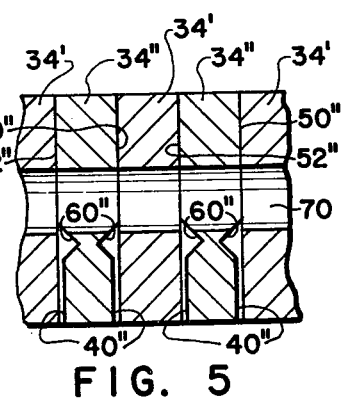

Still another alternate embodiment is illustrated in FIG. 5. In this embodiment, segments 34" having grooves 40", 60" formed in their opposite side walls 50", 52" are sandwiched between segments 34' which, as described previously, have planar side walls with no grooves formed therein. Other alternate arrangments of segments presenting various interconnected and communicating arrays of vacuum channel grooves and supply grooves may also be used, as will be apparent to those skilled in the art in view of the foregoing description.

The present invention provides a simple and inexpensive system for fabricating vacuum sizing apparatus. The required structural segments 34, 34', 34" can be formed from any of a wide range of desirable materials, including hard, corrosion resistant materials such as stainless steel. The vacuum channel and supply grooves 40, 40'', 60, 60'', 62 can be formed in the side walls, 50, 50'', 52, 52'' using a standard milling cutter on a conventional milling machine, or a standard grinding wheel on a conventional surface grinder. The cross sections and arrangements of these grooves can be selected to best satisfy the needs of a particular application. The structural segments can be assembled and disassembled with ease.

Figure 6:
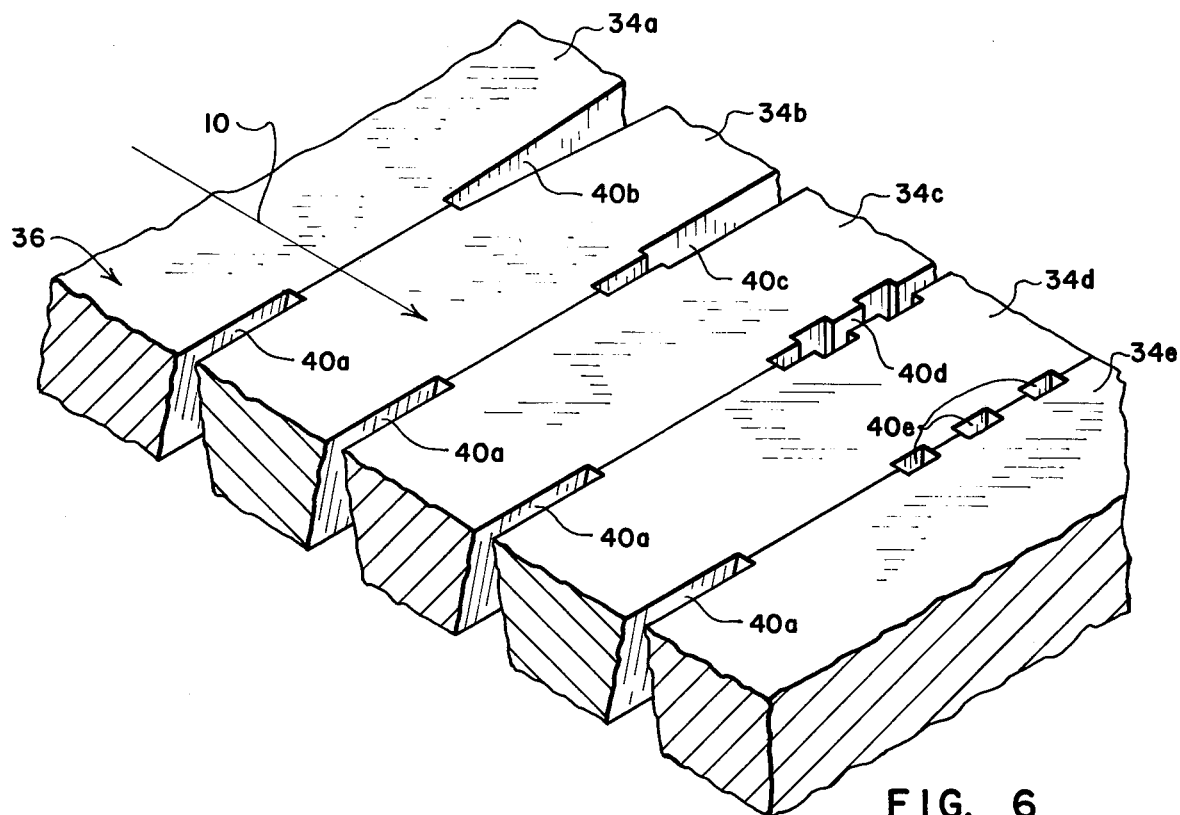
Figure 7:
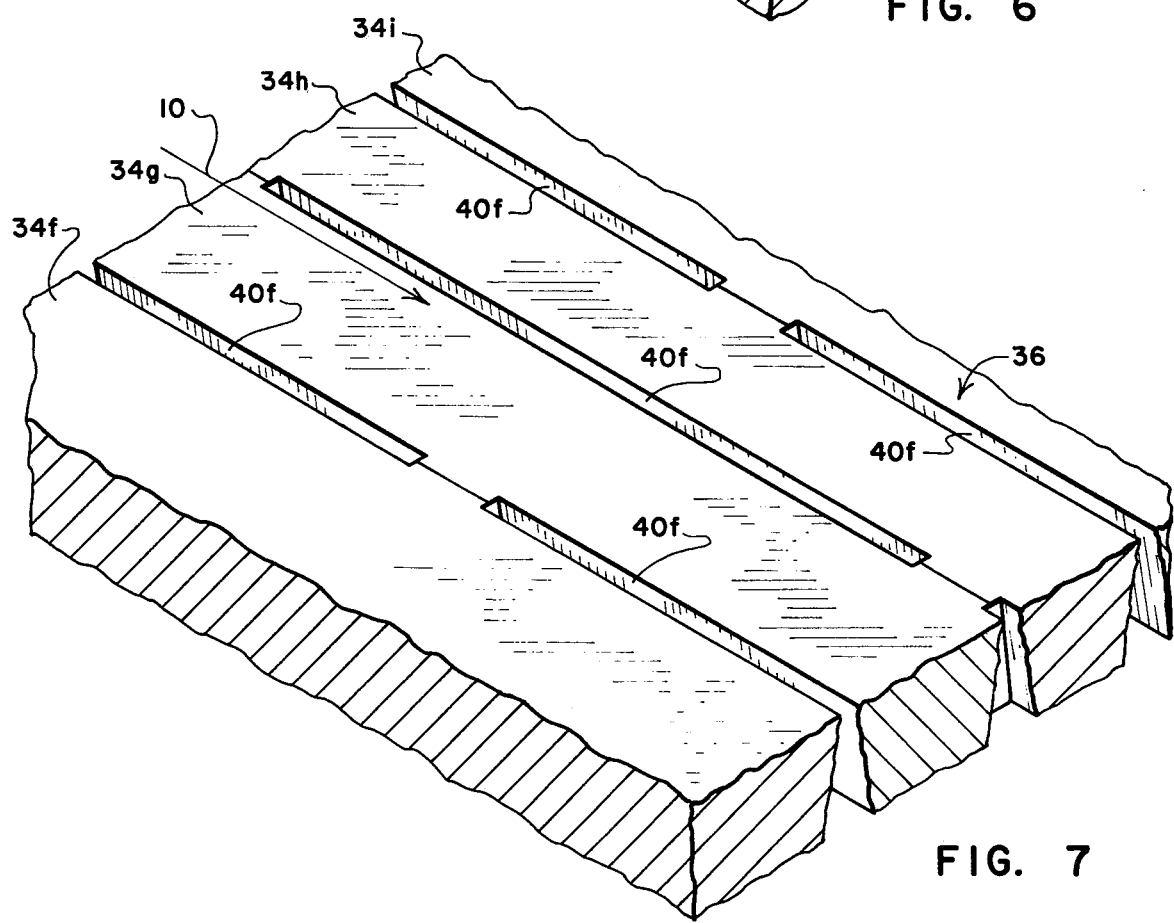

Referring to FIGS. 6 and 7, still other configurations and arrangements of vacuum channels 40a, 40b, 40c, 40d, 40e, 40f are shown formed in side walls of segments 34a, 34b, 34c, 34d, 34e, 34f, 34g, 34h, 34i. The segments 34a–34e are arranged with their side walls extending transversely to the path of travel of a body of plastics material, as indicated by an arrow 10 in FIG. 6. The segments 34f–34i are arranged with their side walls paralleling the path of travel of a body of plastics material, as indicated by an arrow 10 in FIG. 7.

The vacuum channels 40a are formed by mating grooves which are milled or ground into side walls of adjacent ones of the segments 34a–34e. The channels 40a taper in cross section as they extend away from the vacuum sizing surface 36. The tapered configuration of the channels 40a helps prevent their becoming clogged. As will be readily apparent to those skilled in the art, the present invention's use of a segmented sizing structure permits the formation of this type of tapered vacuum channel quite inexpensively.

The vacuum channel 40b is formed by mating grooves provided in adjacent side walls of the segments 34a, 34b. The channel 40b varies in the cross section along its length. While the channel 40b is shown as having side walls which extend perpendicularly to the plane of the sizing surface 36, this channel can, of course, have side walls which taper in the manner of the side walls of the channels 40a.

The vacuum channels 40c and 40d are formed by mating grooves provided in side walls of the segments 34b, 34c, 34d. The channels 40c, 40d have stepped configurations with relatively narrow groove portions extending along parts of their lengths and relatively wider groove portions extending along other parts of their lengths. While the channels 40c, 40d are shown as having side walls which extend perpendicularly to the plane of the sizing surface 36, these channels can, of course, have side walls which taper in the manner of the side walls of the channels 40a.

The channels 40e are formed by mating grooves provided in adjacent side walls of the segments 34d, 34e. The channels 40e are elongate in configuration and are located in longitudinally spaced relationship to each other. While the channels 40e are shown as being substantially identical in cross section and as being substantially equally spaced, these spaced channels can, of course, be formed of differing cross sections and can be variably spaced as desired for a particular application. While the grooves 40e are shown as having side walls which extend perpendicularly to the plane of the sizing surface 36, they can, of course, have side walls which taper in the manner of the side walls of the channels 40a.

The vacuum channels 40f are formed by mating grooves provided in adjacent side walls of the segments 34f–34i. The channels 40f are much like the channels 40e except that they are of longer length and have side walls which taper in the manner of the side walls of the channels. The channels 40f may be arranged in a staggered array as shown in FIG. 7, or may be arranged side-by-side as are the channels 40a shown in FIG. 6.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exist in the invention disclosed.

What is claimed is:

1. In a vacuum sizing apparatus of the type having:
   (a) a structure defining an elongate through passage, the structure being adapted to be positioned downstream from an extruder with the passage extending along a path followed by a deformable body of settable material being extruded substantially continuously from the extruder;
   (b) the structure having inner wall portions which define at least a part of the passage and which present a passage cross section unto which outer surface portions of the extruded body are to be conformed as the body travels through the passage;
   (c) the inner wall portions being provided with a plurality of vacuum evacuation openings through which gases may be evacuated from the passage to form a vacuum therein in the vicinities of the inner wall portions for causing outer surface portions of the extruded body to be brought into conforming engagement with the inner wall portions to thereby conform outer surface portions of the body to the passage cross section defined by the inner wall portions as the body travels through the passage;
   the improvement wherein:
   (a) the structure comprises a plurality of structural segments arranged in side-by-side relationship, with adjacent ones of the segments having side walls extending in surface-to-surface mating engagement, and with the segments having inner walls extending substantially contiguously to define the inner wall portions of the passage;
   (b) the vacuum evacuation openings being located at the junctures of the side walls and the inner walls, and each of the evacuation openings forming the inner end of a separate vacuum evacuation channel;
   (c) the vacuum evacuation channels being formed, at least in part, by grooves machined in selected ones of the mating side walls of adjacent ones of the structural segments;
   (d) conduit means interconnecting the channels and communicating the channels with a vacuum source for evacuating the passage in the vicinities of the regions where the vacuum evacuation channels open through the inner wall portions to bring outer surface portions of the body into conforming engagement with the inner wall portions as the body passes through the passage; and,
   (e) clamping means releasably clamping the segments together to form a rigid structure with the inner walls defining smooth and contiguously extending inner wall portions which are imporous except for the vacuum evacuation openings which open through the inner wall portions.

2. The vacuum sizing apparatus of claim 1 wherein at least one of the vacuum channels is defined by a groove formed in the side wall of one of its associated adjacent segments, the groove facing toward and being closed by a flat surface portion of the side wall of the other of the associated adjacent segments.

3. The vacuum sizing apparatus of claim 1 wherein at least one of the vacuum channels is formed by overlying communicating grooves formed in both of the mating side walls of its associated adjacent segments.

4. The vacuum sizing apparatus of claim 1 wherein the structural segments have substantially flat side walls on opposite sides thereof, and selected ones of the structural segments have vacuum channel grooves formed in only one of their side walls.

5. The vacuum sizing apparatus of claim 1 wherein the structural segments have substantially flat side walls on opposite sides thereof, and selected ones of the structural segments have vacuum channel grooves formed in both of their side walls.

6. The vacuum sizing apparatus of claim 1 wherein at least one of the segment side walls has a plurality of vacuum channel grooves formed therein together with a further groove, the further groove forming part of the conduit means and being operative to communicate the vacuum channel grooves formed in the one segment side wall.

7. The vacuum sizing apparatus of claim 6 wherein the conduit means additionally includes aligned holes formed through selected ones of the segments for communicating the further groove with the vacuum source.

8. The vacuum sizing apparatus of claim 1 wherein a plurality of vacuum channel grooves are formed in a certain one of two mating side walls of a pair of adjacent segments, and the conduit means includes a further groove formed in a selected one of the two mating side walls, the further groove being operative to establish communication between the vacuum channel grooves formed in the certain one of the two mating side walls.

9. The vacuum sizing apparatus of claim 8 wherein the conduit means additionally includes a hole opening through at least one of the two mating side walls for communicating the further groove with the vacuum source.

10. The vacuum sizing apparatus of claim 1 wherein at least one of the vacuum channels is defined, in part, by a wall portion which extends perpendicularly to the plane of its adjacent sizing surface portion.

11. The vacuum sizing apparatus of claim 1 wherein at least one of the vacuum channels is defined, in part, by a pair of planar wall portions which extend perpendicularly to the plane of the adjacent sizing surface portion.

12. The vacuum sizing apparatus of claim 11 wherein the planar wall portions extend in substantially parallel planes.

13. The vacuum sizing apparatus of claim 11 wherein the planar wall portions extend in non-parallel relationship to each other.

14. The vacuum sizing apparatus of claim 1 wherein at least one of the vacuum channels is defined, in part, by a pair of spaced side-by-side planar wall portions which extend in non-parallel relationship to each other thereby providing the one vacuum channel with a non-uniform cross section.

15. The vacuum sizing apparatus of claim 1 wherein at least one of the vacuum channels has a substantially uniform cross section along its length.

16. The vacuum sizing apparatus of claim 1 wherein at least one of the vacuum channels has a substantially non-uniform cross section along its length.

17. The vacuum sizing apparatus of claim 1 wherein selected ones of the vacuum channels are of elongate cross section and are arranged in a longitudinally spaced array along the length of the passages.

18. The vacuum sizing apparatus of claim 1 wherein selected ones of the vacuum channels are arranged in a spaced side-by-side array extending substantially transversely of the length of the passage.

19. The vacuum sizing apparatus of claim 1 wherein at least one of the vacuum channels is of elongate cross section and is defined, in part, by spaced pairs of side wall portions, one of the pairs being more widely spaced than another of the pairs.

20. The vacuum sizing apparatus of claim 1 wherein the mating side walls of adjacent segments extend substantially transversely of the length of the passage.

21. The vacuum sizing apparatus of claim 1 wherein the grooves have identical cross-sectional configurations and sizes.

22. The vacuum sizing apparatus of claim 1 wherein the clamping means includes fastener means extending through aligned holes formed in the segments.

* * * * *